United States Patent
Chu et al.

(10) Patent No.: US 9,489,617 B2
(45) Date of Patent: Nov. 8, 2016

(54) NEUROMORPHIC SYSTEM AND METHOD FOR OPERATING THE SAME

(71) Applicant: GWANGJU INSTITUTE OF SCIENCE AND TECHNOLOGY, Gwangju (KR)

(72) Inventors: Myong-Lae Chu, Gwangju (KR); Byung-Geun Lee, Gwangju (KR); Moon-Gu Jeon, Gwangju (KR); Ahmad Muqeem Sheri, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 0 days.

(21) Appl. No.: 14/793,127

(22) Filed: Jul. 7, 2015

(65) Prior Publication Data
US 2016/0004964 A1  Jan. 7, 2016

(30) Foreign Application Priority Data
Jul. 7, 2014  (KR) .................. 10-2014-0084487

(51) Int. Cl.
*G06F 15/18* (2006.01)
*G06N 3/08* (2006.01)
*G06N 3/04* (2006.01)
*G06N 3/063* (2006.01)

(52) U.S. Cl.
CPC .......... *G06N 3/0454* (2013.01); *G06N 3/049* (2013.01); *G06N 3/0635* (2013.01)

(58) Field of Classification Search
USPC ....................................................... 706/25
See application file for complete search history.

(56) References Cited

U.S. PATENT DOCUMENTS

| 7,265,705 | B1 * | 9/2007 | Lee ............... | H03M 1/145 341/160 |
|---|---|---|---|---|
| 7,392,230 | B2 * | 6/2008 | Nugent .......... | B82Y 10/00 706/15 |
| 9,292,788 | B2 * | 3/2016 | Modha ........... | G06N 3/049 |
| 9,311,596 | B2 * | 4/2016 | Izhikevich ...... | G06N 3/049 |
| 9,320,900 | B2 * | 4/2016 | DiLorenzo ...... | A61B 5/04001 |
| 9,330,356 | B2 * | 5/2016 | Hunt .............. | G06N 3/105 |
| 9,342,781 | B2 * | 5/2016 | Cornebise ....... | G06N 3/0454 |
| 9,367,797 | B2 * | 6/2016 | Hunzinger ...... | G06N 3/049 |
| 9,367,798 | B2 * | 6/2016 | Coenen .......... | G05B 13/027 |
| 9,375,573 | B2 * | 6/2016 | Dilorenzo ....... | A61N 1/3605 |
| 2015/0088797 | A1 * | 3/2015 | Kim ............... | G06N 3/049 706/29 |
| 2015/0154469 | A1 * | 6/2015 | Park .............. | G06N 3/063 706/18 |
| 2016/0004964 | A1 * | 1/2016 | Chu ............... | G06N 3/0454 706/25 |

OTHER PUBLICATIONS

Memristive synaptic plasticity in Pr0.7Ca0.3MnO3 RRAM by bio-mimetic programming N. Panwar; D. Kumar; N. K. Upadhyay; P. Arya; U. Ganguly; B. Rajendran 72nd Device Research Conference Year: 2014 pp. 135-136, DOI: 10.1109/DRC.2014.6872334 IEEE Conference Publications.*

(Continued)

*Primary Examiner* — Michael B Holmes
(74) *Attorney, Agent, or Firm* — Hauptman Ham, LLP

(57) ABSTRACT

A neuromorphic system includes: an unsupervised learning hardware device configured to perform learning in an unsupervised manner, the unsupervised learning hardware device performing grouping on input signals; and a supervised learning hardware device configured to perform learning in a supervised manner with labeled values, the supervised learning hardware device performing clustering on input signals.

14 Claims, 15 Drawing Sheets

(56) References Cited

OTHER PUBLICATIONS

Immunity to Device Variations in a Spiking Neural Network With Memristive Nanodevices Damien Querlioz; Olivier Bichler; Philippe Dollfus; Christian Gamrat IEEE Transactions on Nanotechnology Year: 2013, vol. 12, Issue: 3 pp. 288-295, DOI: 10.1109/TNANO.2013.2250995 IEEE Journals & Magazines.*

Digital CMOS neuromorphic processor design featuring unsupervised online learning Jae-sun Seo; Mingoo Seok 2015 IFIP/IEEE International Conference on Very Large Scale Integration (VLSI-SoC) Year: 2015 pp. 49-51, DOI: 10.1109/VLSI-SoC.2015.7314390 IEEE Conference Publications.*

Biologically Inspired Spiking Neurons: Piecewise Linear Models and Digital Implementation Hamid Soleimani; Arash Ahmadi; Mohammad Bavandpour IEEE Transactions on Circuits and Systems I: Regular Papers Year: 2012, vol. 59, Issue: 12 pp. 2991-3004, DOI: 10.1109/TCSI.2012.2206463 IEEE Journals & Magazines.*

\* cited by examiner

NEUROMORPHIC SYSTEM AND METHOD FOR OPERATING THE SAME

CROSS REFERENCE TO RELATED APPLICATION

This application claims the benefit of Korean Patent Application No. 10-2014-0084487, filed on Jul. 7, 2014, entitled "NEUROMORPHIC SYSTEM AND METHOD FOR OPERATING THE SAME", which is hereby incorporated by reference in its entirety into this application.

BACKGROUND

1. Technical Field

The present disclosure relates to a neuron system, and more specifically to a neuromorphic system implemented in hardware and a method for operating the same.

2. Description of the Related Art

A biological brain contains about hundreds of billions of nerve cells or neurons, which form a complicated neuron network. Each neuron is connected to thousands of other neurons through synapses to communicate signals, achieving intelligence required by living things.

A neuron is a structural and functional unit of a neuron system, as well as a basic unit for transferring information. A synapse is a structure that permits a neuron to pass a signal to another. An axon of a neuron and a dendrite of another neuron are connected to a synapse. A neuromorphic system is a semiconductor circuit that mimics the information processing by a brain by implementing an artificial neuron system resembling a biological neuron system at neuron level. Such a neuromorphic system may be implemented as an electronic circuit using semiconductors.

Such a neuromorphic system may be effectively utilized in implementing an intelligent system capable of adapting itself to uncertain environment, like a biological brain. For example, a neuromorphic system may be used as an interface for awareness and inferring such as character recognition, voice recognition, risk awareness, real-time high-speed signal processing, etc. Moreover, a neuromorphic system may be applied to computers, robots, home appliances, small mobile devices, security and monitoring systems, intelligent vehicles, etc.

A neuromorphic system may be implemented using a supervised learning algorithm, an unsupervised learning algorithm, a semi-supervised learning algorithm, etc. The supervised learning algorithm has an advantage in that it can be implemented in hardware with simple configuration, but has a disadvantage in that it takes much time and cost in configuring learning data for every possible case. The unsupervised learning algorithm has an advantage in that it can achieve high learning efficiency with less learning data by virtue of clustering. However, it requires complicated calculations and is time-consuming since many factors are used in non-linear calculations. To overcome such disadvantages the algorithms suffer, there has been proposed a semi-supervised learning algorithm that employs the unsupervised learning algorithm and the unsupervised learning algorithm together.

The semi-supervised learning algorithm exhibits high learning efficiency with less learning data. However, it still requires a large amount of calculations and thus is time-consuming. For example, it often takes twenty-four hours for calculation. Accordingly, it is impractical to implement the semi-supervised learning algorithm in software.

SUMMARY

An aspect of the present disclosure is to provide a neuromorphic system that can drastically reduce calculation time taken for existing digital signal processing, and a method for operating the same.

Another aspect of the present disclosure is to provide a neuromorphic system that performs learning and testing fast in a similar manner that a biological brain model performs parallel calculation, and a method for operating the same.

In accordance with one aspect of the present disclosure, a neuromorphic system includes: an unsupervised learning hardware device configured to perform learning in an unsupervised manner, the unsupervised learning hardware device performing grouping on input signals; and a supervised learning hardware device configured to perform learning in a supervised manner with labeled values, the supervised learning hardware device performing clustering on input signals.

The unsupervised learning hardware device may include: at least two groups of memristors; at least two pre-stage circuits disposed prior to the groups of memristors and configured to receive an input signal from an external source, each of the pre-stage circuits comprising at least one neuron; and at least two post-stage circuits disposed subsequent to the groups of memristors and configured to receive output signals from the groups of memristors, each of the post-stage circuits comprising at least one neuron. The supervised learning hardware device may include: a memory configured to receive an output value from the unsupervised learning hardware device and receive a label value corresponding to a current input signal; at least two memristors configured to receive the output signal; and a neuron connected to output terminals of the at least two memristors, the output terminals being connected at least to the memory. The supervised learning hardware device may include: at least two memristors configured to receive output values from the unsupervised learning hardware device; a neuron connected via a switch to a node where output lines from the at least two memristors meet; and a ground potential connected via a switch to the node.

In accordance with one aspect of the present disclosure, a method for operating a neuromorphic system includes: performing learning by an unsupervised learning hardware device; updating memristors included in the unsupervised learning hardware device; performing learning by a supervised learning hardware device; and updating memristors included in the supervised learning hardware device.

According to the present disclosure, the neuromorphic system can perform fast learning process and increase drastically learning efficiency.

BRIEF DESCRIPTION OF THE DRAWINGS

The above and other aspects, features and advantages of the present invention will become apparent from the following description of exemplary embodiments given in conjunction with the accompanying drawings, in which.

DETAILED DESCRIPTION

Embodiments of the present disclosure will now be described in detail with reference to the accompanying drawings. However, it should be noted that embodiments of the present disclosure is not limited to the embodiments set forth herein; and those skilled in the art, having benefit of this detailed description, will appreciate that other embodiments are possible by adding, modifying and eliminating elements, which are also deem to be within the scope of the present disclosure.

Prior to describing embodiments of the present disclosure, learning algorithms are described briefly. The spike-timing-dependent plasticity (STDP) algorithm, which may be used for implementing both of the supervised learning algorithm and the unsupervised learning algorithm, can update weights by simply using relative timing of spikes without performing complicated calculations. The restricted Boltzmann machine (RBM) algorithm, which may be used for implementing both of the supervised learning algorithm and the unsupervised learning algorithm, modifies weights by clustering a variety of input patterns.

Both of the algorithms may be used respectively in the semi-supervised learning algorithm according to the present disclosure.

First Embodiment

Figure 1:
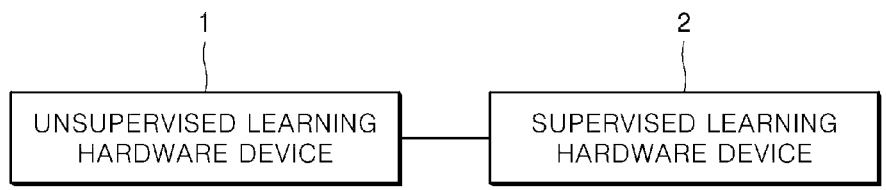
FIG. 1 is a schematic block diagram of a neuromorphic system according to a first embodiment.

FIG. 1 is a schematic block diagram of a neuromorphic system according to a first embodiment.

Referring to FIG. 1, the neuromorphic system according to the first embodiment implemented in hardware, unlike other neuromorphic systems implemented in software requiring a large amount of calculations, includes an unsupervised learning hardware device 1 in which unsupervised learning is performed, and a supervised learning hardware device 2 in which supervised learning is performed. The unsupervised learning hardware device 1 modifies weights between layers using learning data to cluster a variety of input data items. The supervised learning hardware device 2 performs learning using learning data and label values to classify a variety of input data items.

The neuromorphic system according to the first embodiment will be described with example input data items. In describing the neuromorphic system shown in FIG. 1, it is assumed that input data items are received after learning and memristor updating have been completed.

Figure 2:
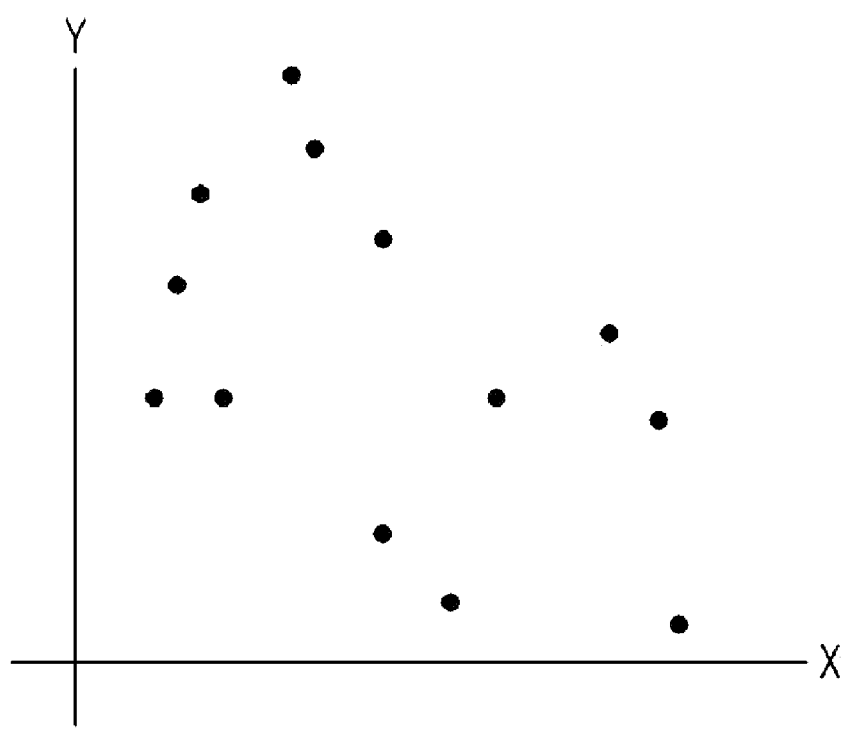
FIG. 2 is a graph showing input data before learning.

FIG. 2 is a graph showing input data items before learning. Referring to FIG. 2, the input data items are randomly distributed in a two-dimensional space.

Figure 3:
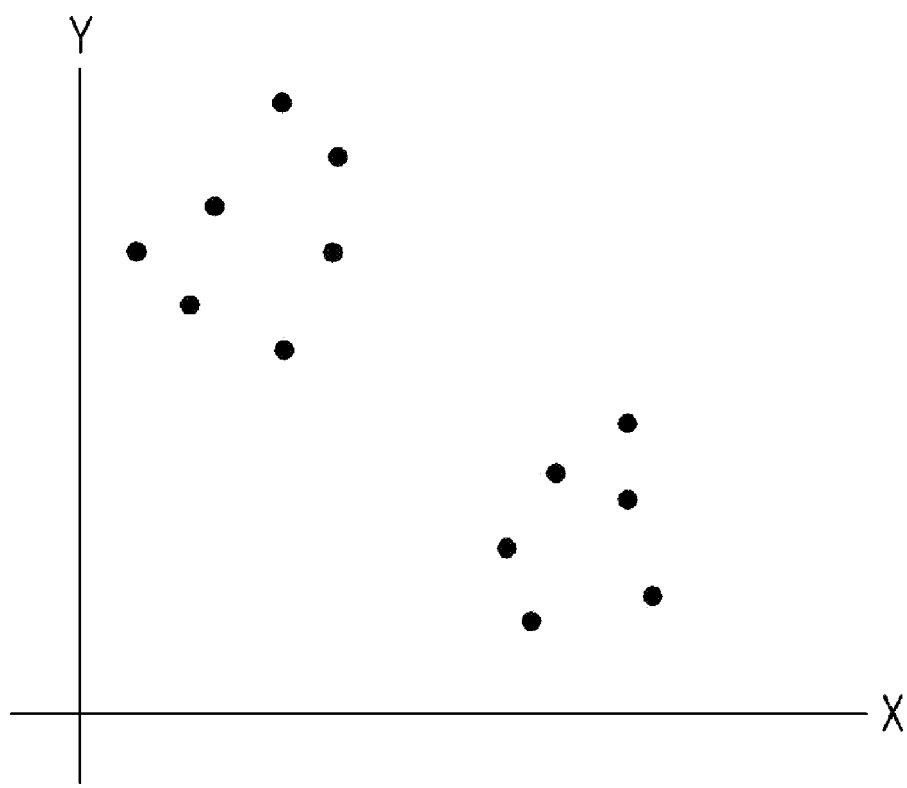
FIG. 3 is a graph showing clustered input data.

The input data items first pass through the unsupervised learning hardware device 1, and then come together to form clustered data items, as shown in FIG. 3 which shows clustered input data items.

Figure 4:
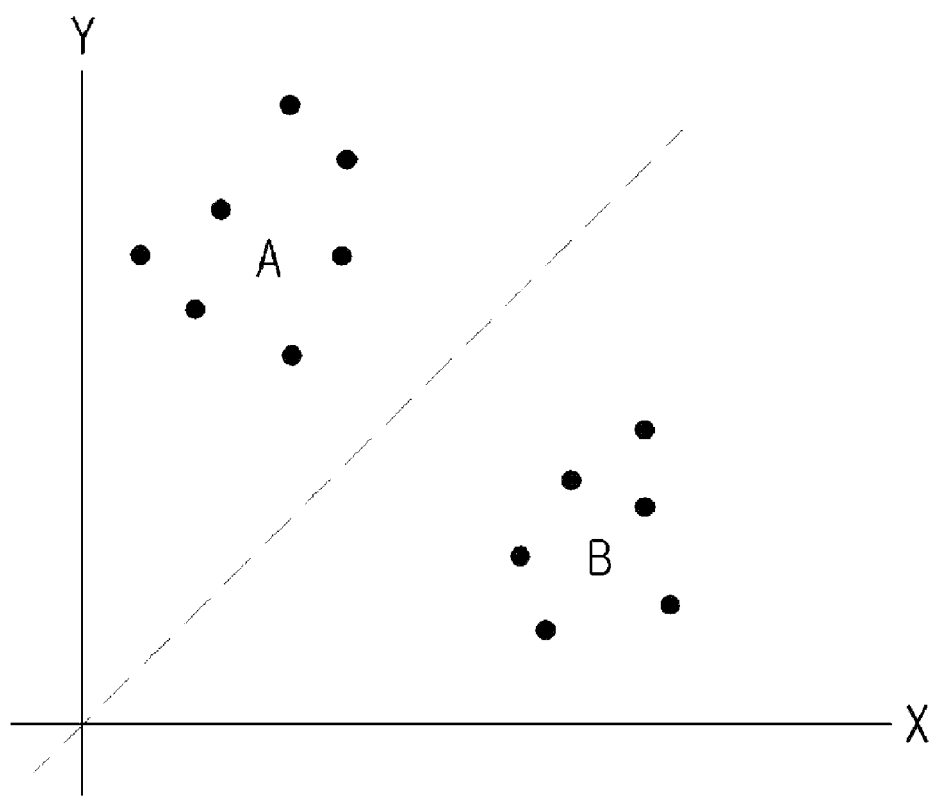
FIG. 4 is a graph showing classified input data.

Then, the input data items pass through the supervised learning hardware device 2, and then are divided into groups denoted by exemplary symbols A and B, as shown in FIG. 4 which shows classified input data items.

Figure 5:
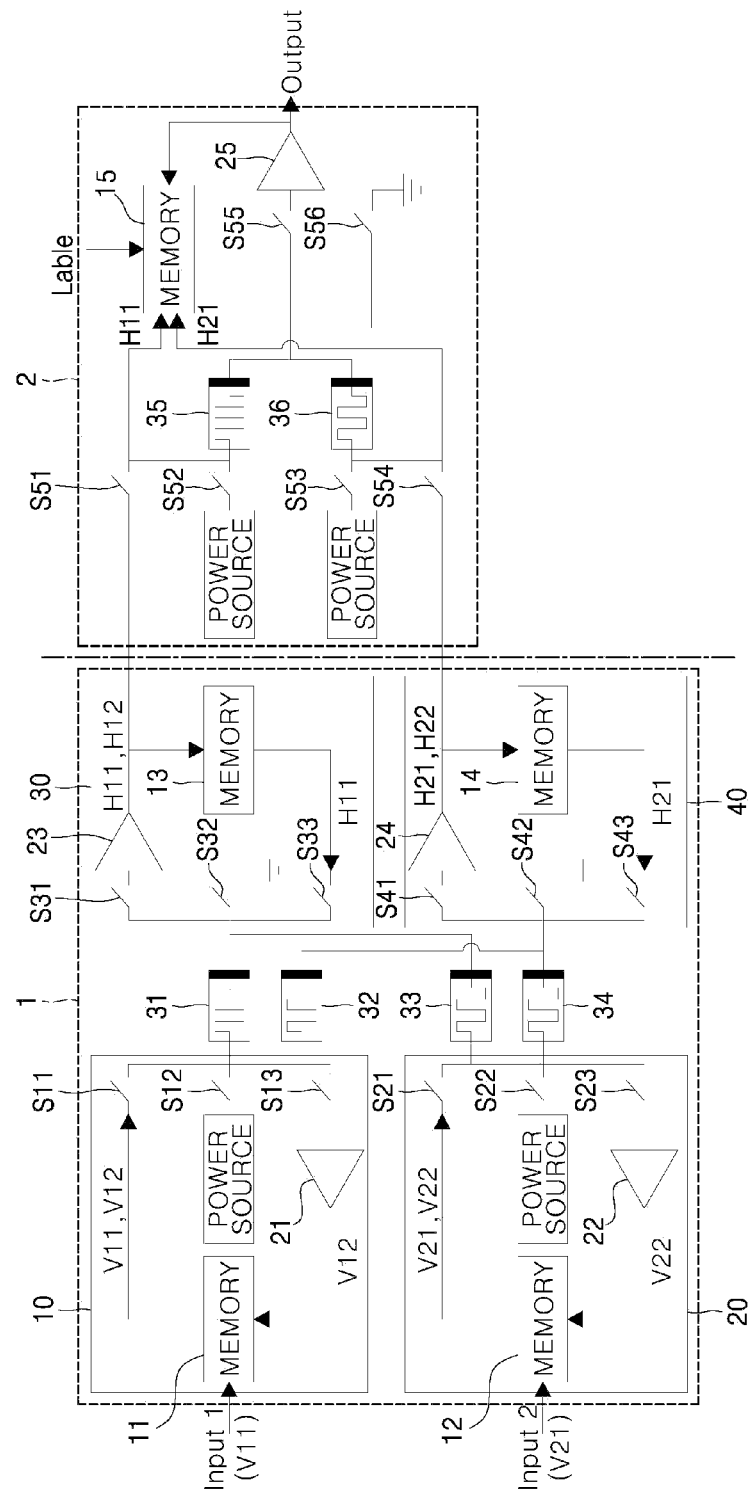
FIG. 5 is a detailed block diagram of the neuromorphic system according to the first embodiment.

Although only one supervised learning hardware device 2 is shown in FIG. 5, two or more supervised learning hardware devices may be provided. For example, by increasing the number of memristors included in the supervised learning hardware devices 2 equal to the number of post-stage circuits 30 and 40 and by assigning different labels to the supervised learning hardware devices 2, it may be possible to distinguish a variety of values.

FIG. 5 is a detailed block diagram of the neuromorphic system according to the first embodiment.

Referring to FIG. 5, the neuromorphic system according to the first embodiment includes the unsupervised learning hardware device 1 and the supervised learning hardware device 2. In the first embodiment, it is assumed that a restricted Boltzmann machine (RBM) algorithm is applied to the unsupervised learning hardware device 1 and the supervised learning hardware device 2.

The unsupervised learning hardware device 1 will be described first.

The unsupervised learning hardware device 1 includes: a group of memristors as many as input signals Input 1, Input 2, etc.; a pre-stage circuit connected to input terminals of the memristors; and a post-stage circuit connected to output terminals of the memristors. For example, the first input signal Input 1 is associated with the groups of memristors 31 and 32, the pre-stage circuit 10, and the post-stage circuit 30. Other input signals have the same configuration with different reference numerals. The memristors may correspond to synapses in a biological neuron network. The pre-stage circuits and the post-stage circuits may correspond to cells including neurons in a biological neuron network. Accordingly, as used herein, a synapse refers to a memristor. A neuron refers to a pre-stage circuit or a post-stage circuit, or both, more specifically to an element denoted by a reference numeral in twenties, excluding a memory, an external power source, and switches from a pre-stage circuit or a post-stage circuit. The memory, the external power source and the switches may be understood as elements necessary for operating neurons.

If there are a number of input signals, the pre-stage circuits may be provided as many as the input signals. In this case, the number of the groups of memristors may increase with the number of the pre-stage circuits. In addition, the number of memristors in a group of memristors connected to each of pre-stage circuit may increase with the number of the post-stage circuits. Each memristors included in the group of memristors may be connected to the output terminal of the pre-stage circuit in parallel and may be connected to the input terminal of the post-stage circuit in parallel. In this manner, the number of neurons and synapses may increase with the number of the input signals. In other words, in the neuromorphic system according to the first embodiment, pre-stage circuits, groups of memristors and post-stage circuits may be added in the vertical direction of FIG. 5.

Further, in order to increase the effect of clustering, the numbers of neurons and synapses may increase. In other words, in the neuromorphic system according to the first embodiment, pre-stage circuits, groups of memristors and post-stage circuits may be added in the horizontal direction of FIG. 5. For example, in FIG. 5, there are four input signals, four pre-state circuits, three memristors in each of the groups of memristors, and three post-stage circuits. In this example, three groups of memristors having an output signal from an output terminal of a post-stage circuit as another input signal, with two memristors in each of the groups of memristors, and two post-stage circuits may be provided. It can be seen that a neuromorphic system is provided in which a synapse has two pathways in series.

As described above, since pathways of synapses (including neurons) can be expanded in the horizontal and vertical directions, the neuromorphic system can exactly mimic a biological neuron system that exhibits high-level intelligence using a number synapse pathways. Although the synapse pathways are expanded vertically and horizontally, i.e., in two-dimension in this embodiment, it will be easily conceivable to those skilled in the art that the synapse pathways can be expanded in three-dimension or more. It shows that the hardware configuration according to the first embodiment is a model capable of exhibiting high-level intelligence by mimicking a biological neuron network.

The neuromorphic system according to the first embodiment includes two pre-stage circuits, two post-stage circuits and one supervised hardware device, and thus may be named as a "2-2-1 neuromorphic system."

The configuration of the pre-stage circuit 10 will be described in detail. The description on the pre-stage circuit 10 may be equally applied to the other pre-stage circuit 20.

The pre-stage circuit 10 includes a first memory 11 that stores the first input signal Input 1, and a transfer signal V11 transmitted in response to the first input signal Input 1 using an external power. The first memory 11 may at least temporarily store a value fed back during the contrastive divergence (CD). In the neuromorphic system according to the first embodiment, memories 11, 12, 13, 14 and 15 may be configured by sharing a single memory, or a separate memory may be used for every group or circuit.

Figure 6:
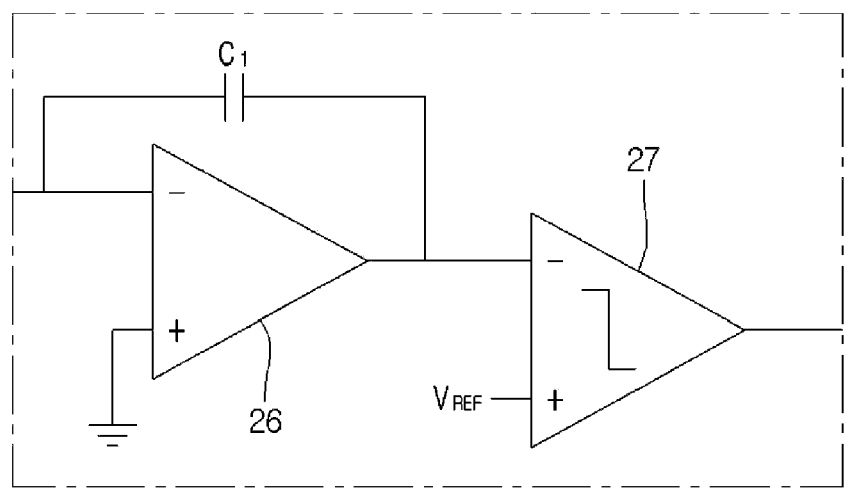
FIG. 6 is a circuit diagram of a neuron.

A first neuron 21, which corresponds to a neuron of a biological neuron network, may be simply configured based on the circuit diagram shown in FIG. 6. Referring to FIG. 6, the first neuron 21 may be configured with an integrator 26 and a comparator 27. If pulses are applied to the integrator 26 for a predetermined time period, the voltage output from the integrator 26 keeps increasing. If the output voltage increases above a certain level, it exceeds a comparison voltage of the comparator 27. When this happens, an output signal is generated from the comparator 27, which means that the first neuron 21 has been tuned on. In other words, the first neuron 21 has fired. If the number or periods of pulses and the amount of current are insufficient, the neuron may not be turned on.

Switches S11, S12 and S13 for implementing individual learning modes and memristor updating for each of the pre-stage circuits, the post-stage circuits and the groups of memristors may be further included. Further, in order to implement memristor update modes or generate a transfer signal corresponding to the first input signal, a power source for supplying an external power may be further included.

Each memristor included in a group of memristors can remember the direction and amount of a current having passed immediately before even if power supply is interrupted, so that the existing state may be restored when power is back. Accordingly, once a resistance is updated by applying pulses, the memristor can remember the stored resistance, and can user the resistance later.

The configuration of the post-stage circuit 30 will be described in detail. The description on the post-stage circuit 30 may be equally applied to the other pre-stage circuit 40.

The pos-stage circuit 30 receives output signals from the memristors connected in parallel to the post-stage circuit 30 in the group of memristors as input signals, and includes a third neuron 23 to which the input signals are input. The operation of the third neuron 23 is identical to that of the first neuron 21; and, therefore, will not be described again. The post-stage circuit 30 includes a third memory 13 that stores an output signal from the third neuron 23 and a transfer signal H11 corresponding to the output signal.

Switches S31 S32 and S33 for implementing individual learning modes and memristor update modes for each of the pre-stage circuits, the post-stage circuits and the groups of memristors may be further included. In addition, although not shown in the drawing for brevity, the post-stage circuit 30 may further include a power source for supplying an external power to generate the transfer signal in response to the output signal from the third neuron 23.

Hereinafter, the supervised learning hardware device 2 will be described.

The supervised learning hardware device 2 receives output signals from the post-stage circuits 30 and 40 as input signals. Each of the input signals branches into two paths, one input to a memristor and the other input to a fifth memory 15. The output terminal of the memristors is connected to a fifth neuron 25. The memory 15 may determine an update value for a memristor by receiving a label value of the supervised learning hardware device 2 to which it belongs and an output value from the fifth neuron 25.

The operation and effects of the neuromorphic system according to the first embodiment will be time-sequentially described in more detail with reference to FIGS. 7 to 13. In the drawings, currently-activated circuit operations are indicated by bold lines.

Figure 7:
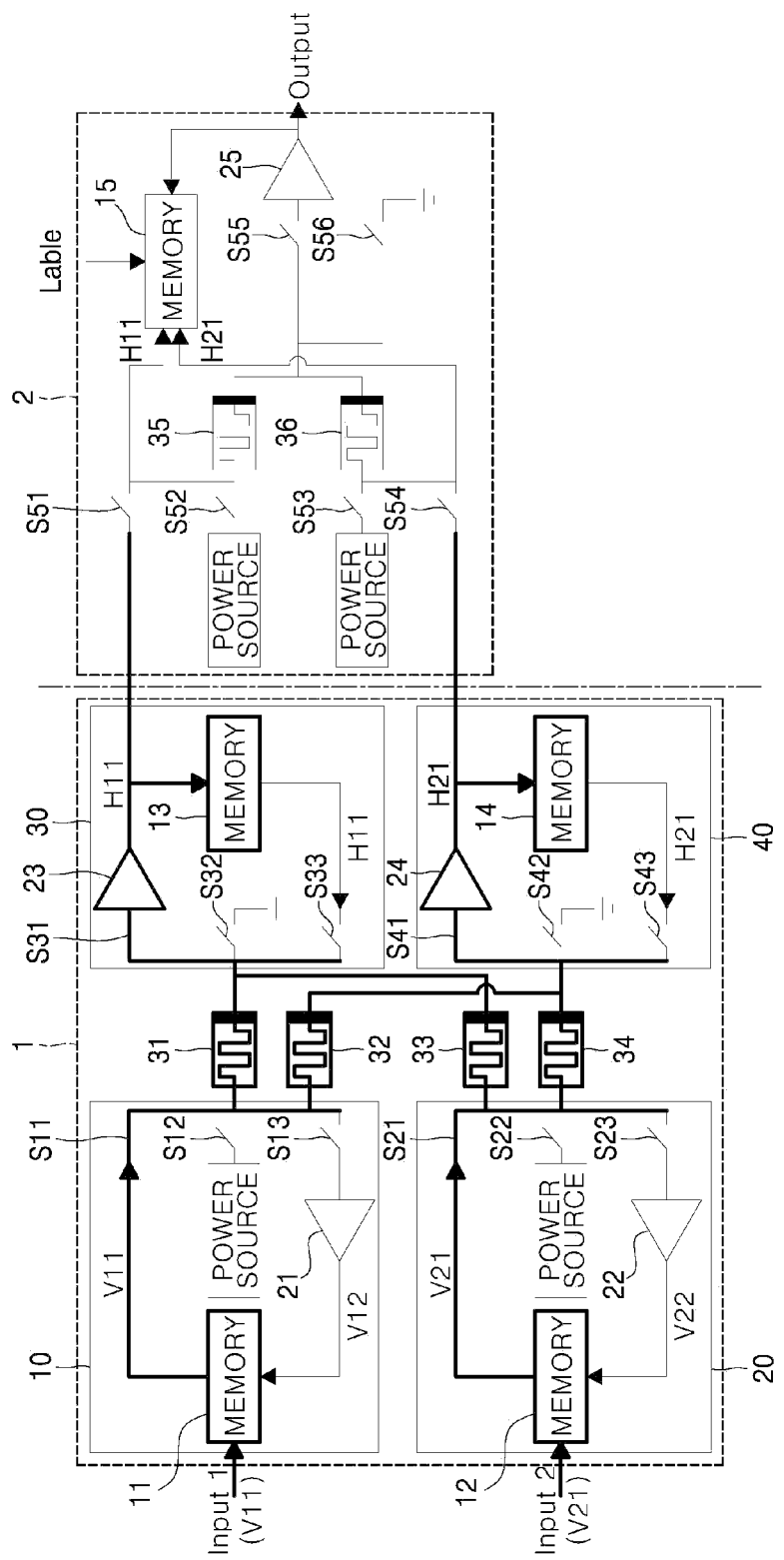
FIG. 7 is a diagram for illustrating a first positive-phase contrastive divergence.

Initially, the unsupervised learning hardware device 1 performs learning sequentially. FIG. 7 is a diagram for illustrating a first positive-phase contrastive divergence.

Referring to FIG. 7, when a first input signal and a second input signal are input, memories 11 and 12 send out corresponding output signals, respectively. The output signals from the pre-stage circuits 10 and 20 may be equal to the input signals, respectively. In addition, the input signals and the output signal may be stored in the memories 11 and 12. For example, the input signals and the output signals for the first pre-stage circuit 10 and the second pre-stage circuit 20 may be equal to one another, and values of V11 and V21 may be stored in the memories 11 and 12, respectively.

The output signals V11 and V21 are transferred to memristors 31, 32, 33 and 34 via switches S11 and S21. The memristors included in each of the groups of memristors are connected in parallel to the respective pre-stage circuits 10 and 20 and are connected in parallel to the respective post-stage circuits 30 and 40. The memristors are connected such that every pre-stage circuit 10 or 20 is connected to one of the post-stage circuits 30 and 40 if possible. In this manner, the efficiency of grouping can be increased. In the first embodiment, the first and third memristors 31 and 33 are connected to the first post-stage circuit 30, while the second and fourth memristors 32 and 34 are connected to the second post-stage circuit 40. It can be seen that the first and second memristors 31 and 32 are connected to the first pre-stage circuit 10, while the third and fourth memristors 33 and 34 are connected to the second pre-stage circuit 20.

The neurons 23 and 24 disposed in the post-stage circuits 30 and 40, respectively, receive output signals from the memristors to be turned off or turned on. The output signals H11 and H21, which are generated when the neurons 23 and 24 are tuned off or turned on, are stored in the memories 13 and 14. As an example, V11 may be 1, V21 may be 0, H11 may be 0, and H21 may be 0 in volts. It is apparent to those skilled in the art that other values may be used. (The same applies in the following description.) The H11 and H21 may be affected by initial values of the memristors 31, 32, 33 and 34 and initial values of the neurons 23 and 24. In addition, the values of H11 and H21 may vary depending on the amplitude and duration of the first and second input signals.

Figure 8:
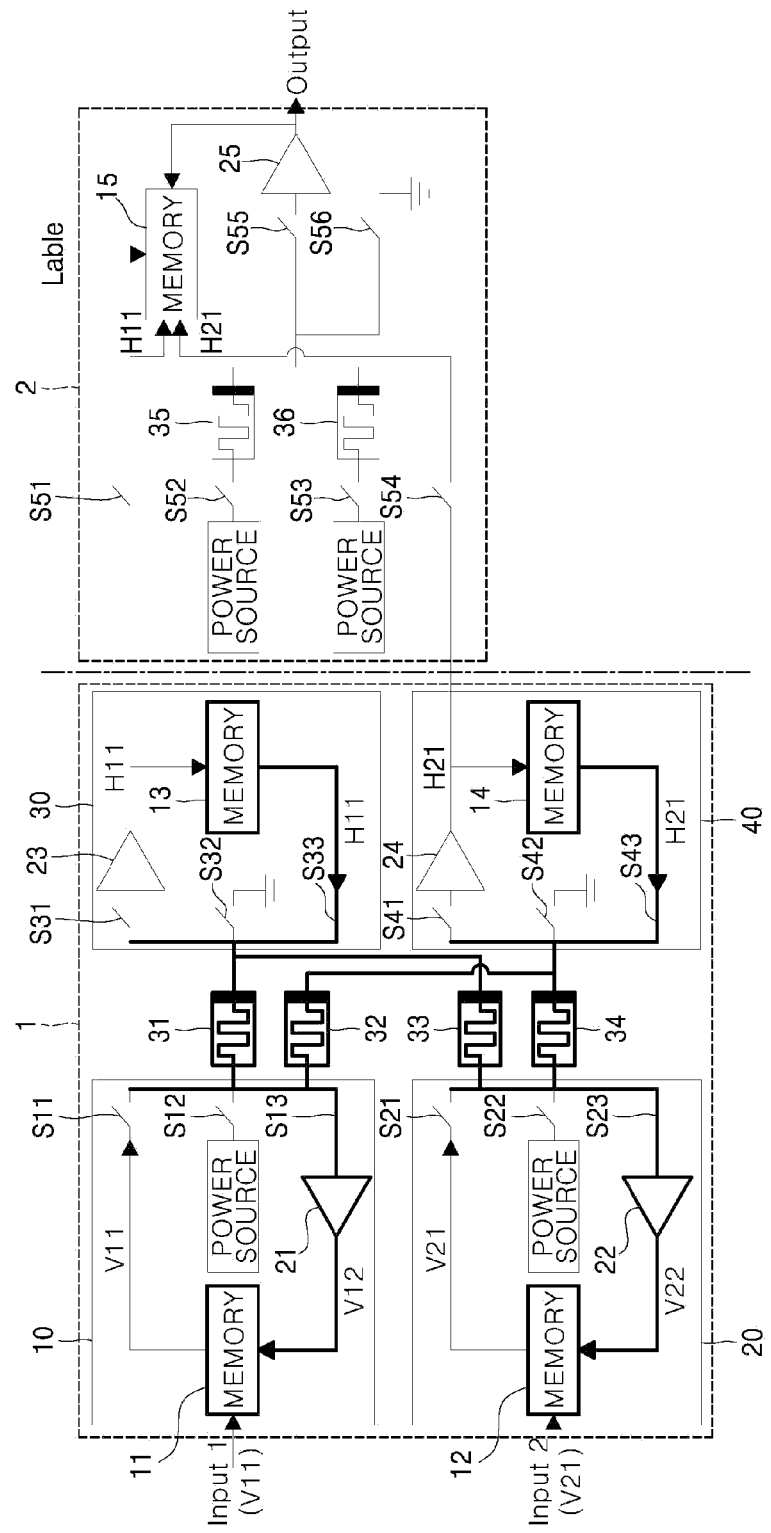
FIG. 8 is a diagram for illustrating a first negative-phase contrastive divergence.

FIG. 8 is a diagram for illustrating a first negative-phase contrastive divergence.

Initially, values corresponding to the output signals H11 and H21 stored in the third and fourth memories 13 and 14, respectively, are output. In dosing so, power supplied from an external power source may be used. The output signals are input to the pre-stage circuits 10 and 20 via closed switches S33 and S43 and the memristors 31, 32, 33 and 34. The neurons 21 and 22 output values corresponding to the input values as output signals V12 and V22. The output signals V12 and V22 may be stored in the memories 11 and 12, respectively. The V12 and V22 may be affected by the amplitudes and durations of the input values, initial values of the memristors 31, 32, 33 and 34 and initial values of the neurons 23 and 24.

For example, the H11 may be 0, the H21 may be 0, the V12 may be 1, and the V22 may be 0.

Figure 9:
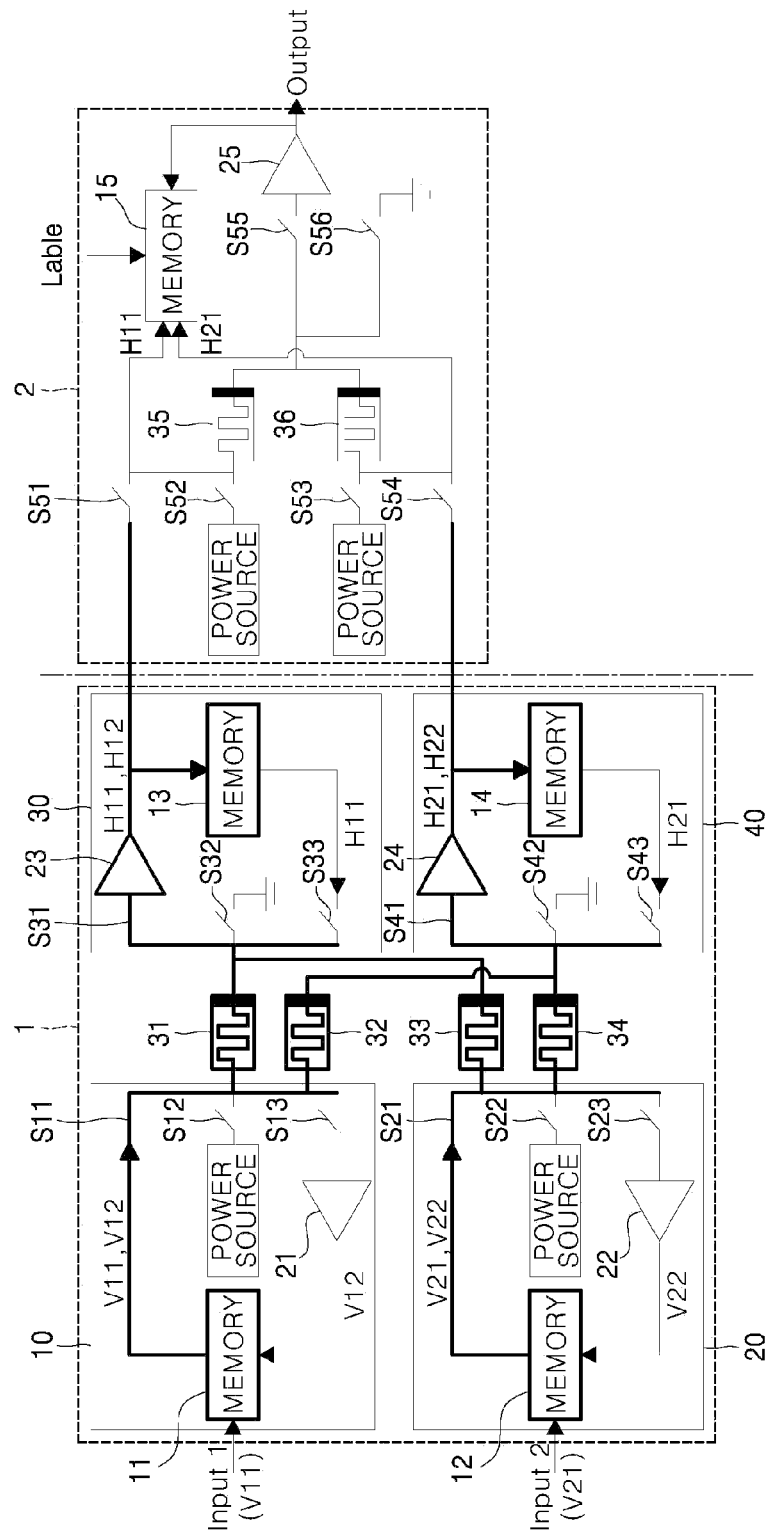
FIG. 9 is a diagram for illustrating a second positive-phase contrastive divergence.

FIG. 9 is a diagram for illustrating a second positive-phase contrastive divergence. The values corresponding to the output signals V21 and V22 stored in the first and second memories 11 and 12 are output. Although it is assumed that the two values are equal to each other for convenience of illustration, the values may be different from each other. In dosing so, an external power source may be used. The output values are input to the post-stage circuits 30 and 40 via closed switches S11 and S21 and the memristors 31, 32, 33 and 34. The neurons 23 and 24 output output signals H12 and H22 corresponding to the input values. The output signals H12 and H22 may be stored in the third and fourth memories 13 and 14.

The H12 and H22 in the current state may be affected by the amplitudes and durations of the input values, initial values of the memristors 31, 32, 33 and 34 and initial values of the neurons 23 and 24. For example, V21 may be 1, V22 may be 0, H12 may be 1 and H22 may be 0.

According to the above-described process, it can be seen that the contrastive divergence algorithm is carried out three times to perform learning. By doing so, $\Delta W$ as a variation in weight between layers in the RBM algorithm may be determined.

Specifically, the memristors 31 and 33 connected to the first post-stage circuit 30 having H12 of 1 may have a smaller resistance than a resistance of the memristors 32 and 24 connected to the second post-stage circuit 40 having H22 of 0 by reducing the amount or amplitude of pulses applied to the memristors. In this regard, varying the resistance of each of the memristors may be understood as applying $\Delta W$ to a hidden layer of the RBM. In this embodiment, according to the above-described memristor updating, it is possible to increase the possibility that the third neuron 23 of the first post-stage circuit 30 is turned on in response to the currently input first and second input signals. This operation can be understood as performing grouping.

Once learning is performed through the above-described process, the process of updating memristors is performed.

Figure 10:
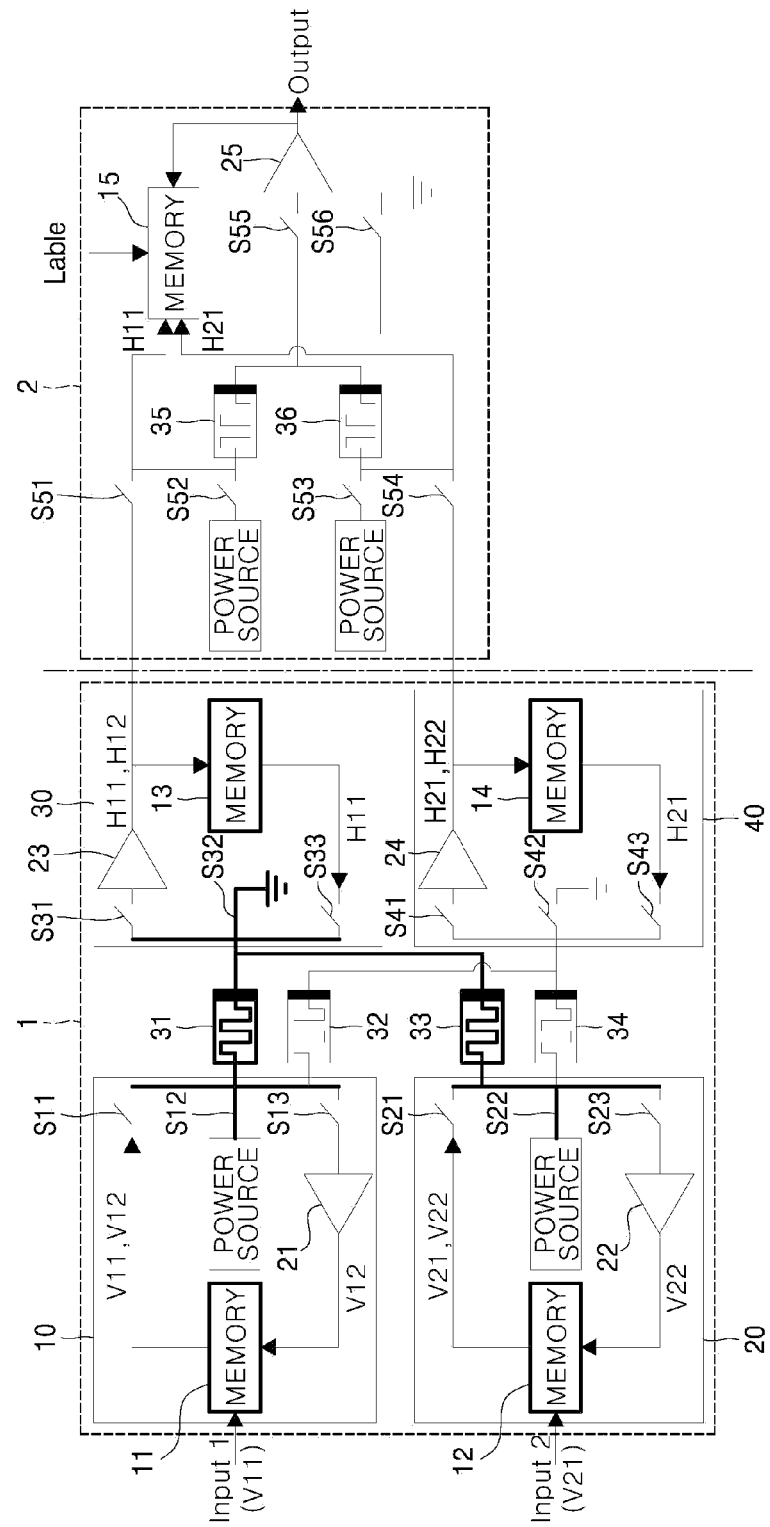
FIGS. 10 and 11 are diagrams for illustrating processes of updating memristors connected to first and second post-stage circuits, respectively.
Figure 11:
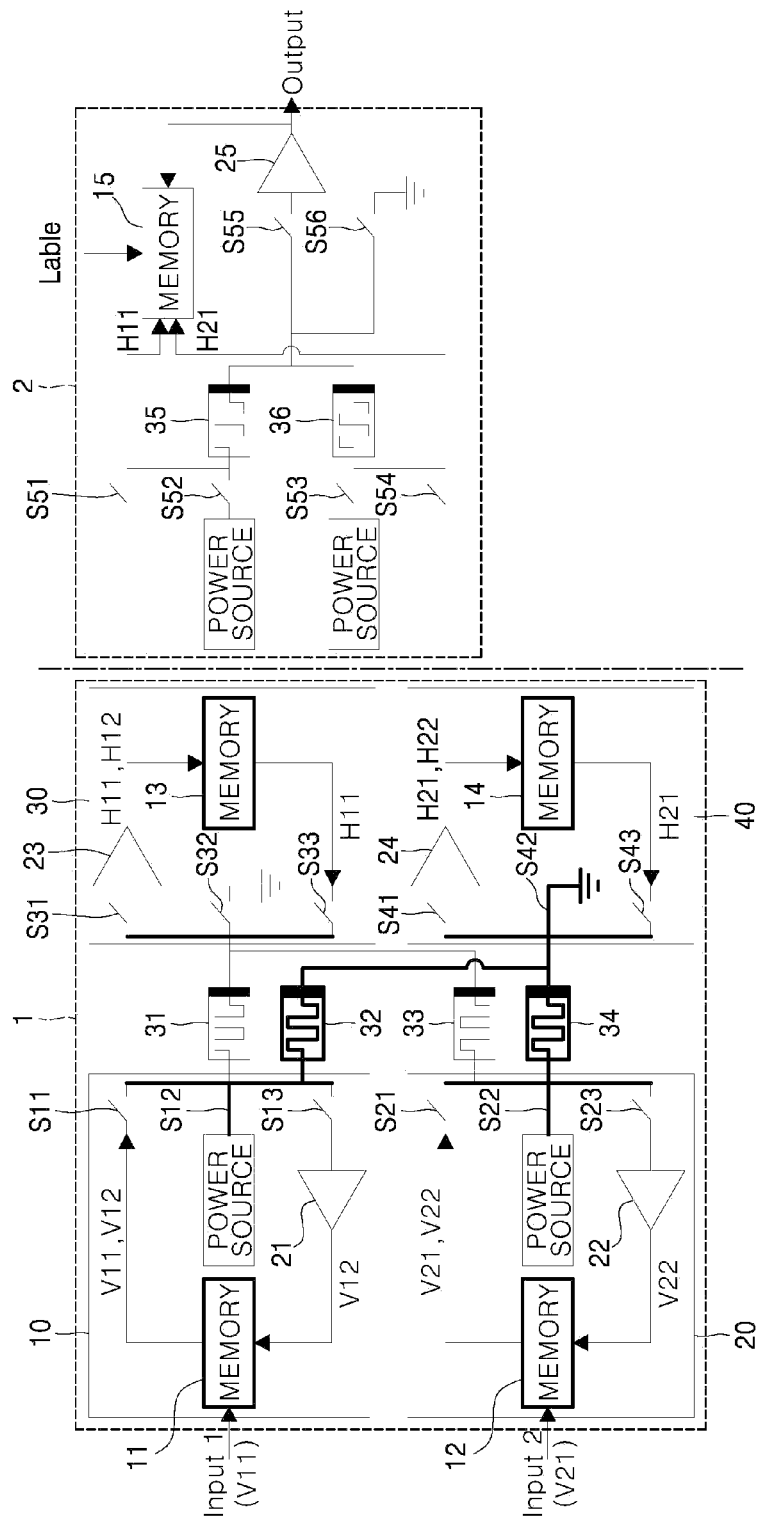

FIGS. 10 and 11 show the process of updating memristors connected to the first and second post-stage circuits. The first post-stage circuit may be updated prior to the second post-stage circuit and vice versa.

The process of updating memristors may be performed in such a manner that only the switches connected to an external power source, i.e., S12 and S22 in the pre-stage circuits 10 and 20, respectively, are closed while others are open, and only the switch connected to the ground potential in the first post-stage circuit 30, i.e., S32 is closed while others are open. All of the switches in the second post-stage circuit 40 are open. By applying a signal from an external circuit in this state, it is possible to update the memristors 31 and 33 connected to the first post-stage circuit 30. The updated value may be a value varying depending on the value of H12 stored in the third memory 13 as described above.

The above-described process is a process of updating the first post-stage circuit 30. The process of updating the second post-stage circuit 40 may be performed by changing the open states of the switches of the first post-stage circuit and the open states of the switches in the second post-stage circuit and applying an external signal. The external signal may be a value varying depending on the value of H22 stored in the memory 14.

After all of the memristors are updated, the task by the unsupervised learning hardware device 1 is terminated.

For the unsupervised learning hardware device 1, the process of learning with an input signal from an external source and the process of updating memristors may be performed repeatedly for a number of combinations of input signals. In this manner, versatility for a variety of input signals can be increased. Although two input signals are used in this embodiment, if forty input signals or more are used, for example, $2^{40}$ combinations of input signals are possible, and the process of learning on as many combinations of input signals as possible can be performed. Accordingly, if the updating is performed accordingly, it is possible to increase grouping performance with respect to a variety of combinations of input signals. It will be easily understood that the change of the combination of input signals may be performed after the learning by the supervised learning hardware device and the updating the values of the memristors have completed.

After the learning by the unsupervised learning hardware device 1 and the updating the memristors have completed through the above-described processes, the supervised learning hardware device 2 performs learning sequentially.

Figure 12:
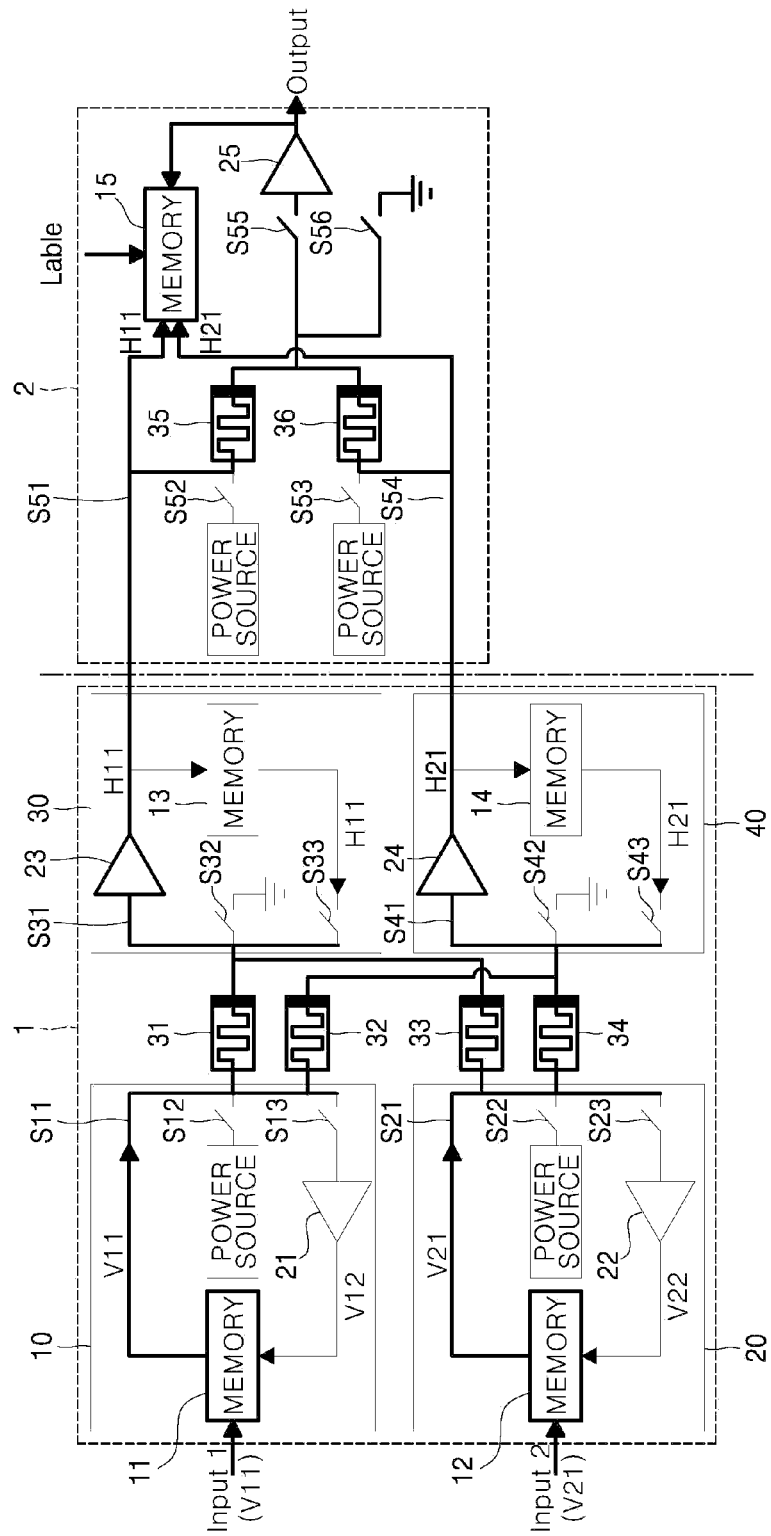
FIG. 12 is a diagram for illustrating a process of learning by the supervised learning hardware device.

FIG. 12 is a diagram for illustrating a process of learning by the supervised learning hardware device.

Referring to FIG. 12, the input signal in the pattern used at the time of the learning by the unsupervised learning hardware device 1 and the updating of the values of the memristors are input, along with a label value. It will be understood that other signals may also be used. For example, this process may be used in a touch panel having pixels, assuming that each pixel is turned on/off using input signals Input 1 and Input 2, and the number input to the touch panel as a whole is a label value.

The input signals are input to the fifth and sixth memristors 35 and 36 via the closed switches S11 and S21, the memristors, the closed switches S31 and S41, the third and fourth neurons 23 and 24, and the closed switches S51 and S54. In addition, the input signal branches into two paths to be input to the fifth memory 15. The fifth and sixth memristors 35 and 36 output output values corresponding to the input signal to the fifth neuron 25 via the closed switch S55. The fifth neuron 25 sends a feedback signal to the fifth memory 15 in addition to outputting the corresponding output value as output signal Output.

According to the above-described process, the label value, the output values from the third and fourth neuron 23 and 24, and the output value from the fifth neuron 25 may be stored in the fifth memory 15. The amount of update for the fifth memristors 35 and the sixth memristors 36 may be determined using the stored values. For example, if the label value is ON, H11 is 1 and H21 is 1, the fifth neuron 25 is supposed to be turned on but may not be turned on. In this case, the memristors may be updated such that the resistances of the fifth and sixth memristors 35 and 36 are reduced.

If there are a number of input signals, a number of supervised learning hardware devices may be provided in parallel. A group of such supervised learning hardware devices may be collectively referred to as the supervised learning hardware device.

Figure 13:
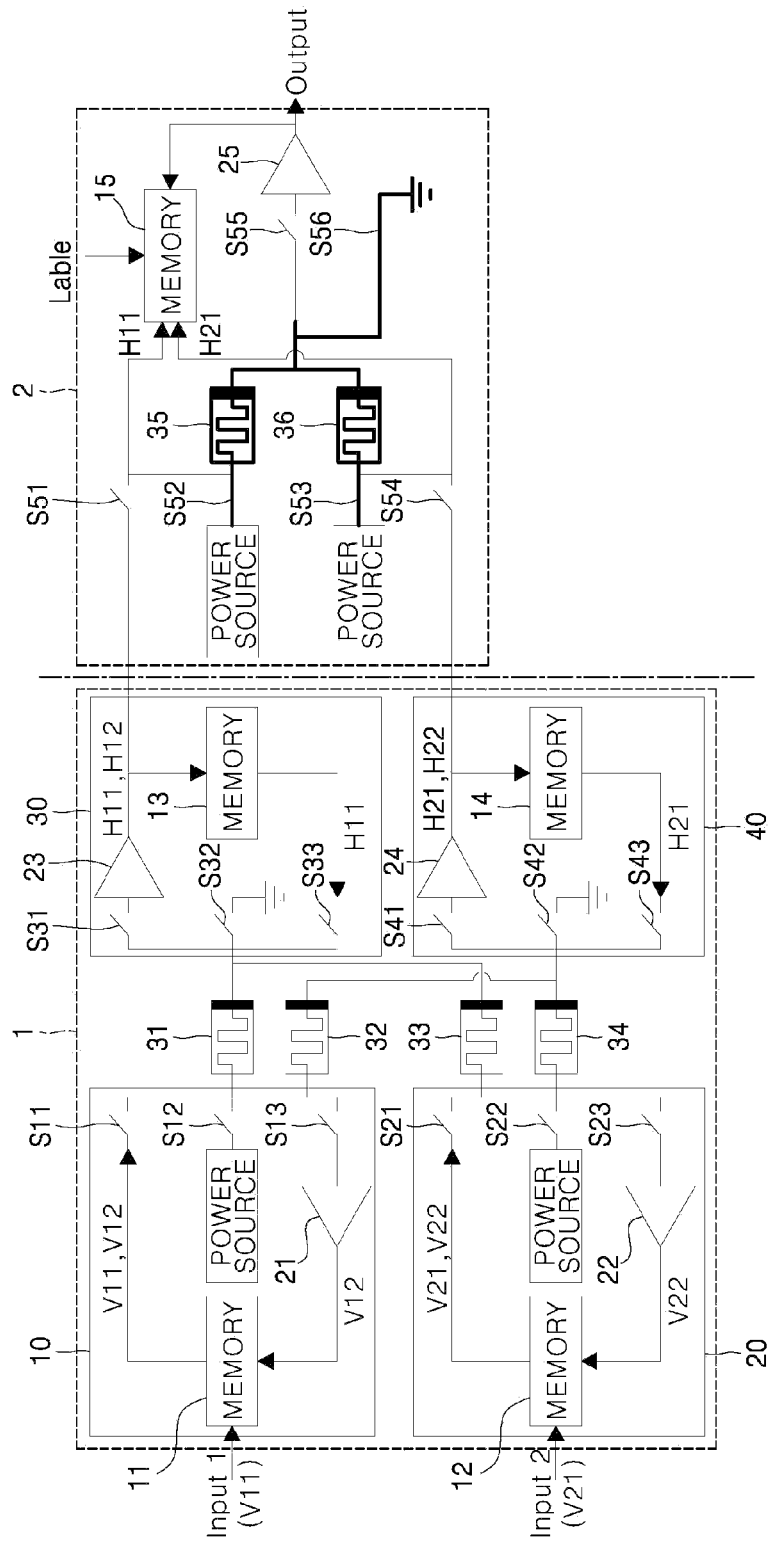
FIG. 13 is a diagram for illustrating a process of updating memristors of the supervised learning hardware device.

FIG. 13 is a diagram for illustrating a process of updating memristors of the supervised learning hardware device.

Referring to FIG. 13, switches S52 and S53 are closed, and the switch S56 is closed, so that an external power is supplies to the memristors. By doing so, the memristors may be updated as desired. The process of updating the memristors may be performed sequentially for multiple input signals. In addition, when there are groups of memristors parallel to one another, the processes of learning and updating may be performed group by group sequentially.

In the neuromorphic system according to the first embodiment, the learning process may be performed faster through automated switching and learning with respect to combined input signals without requiring complicated calculations. In addition, it is possible to implement a system that mimics or emulates a neuron system as similar as possible, thereby improving learning efficiency.

Figure 14:
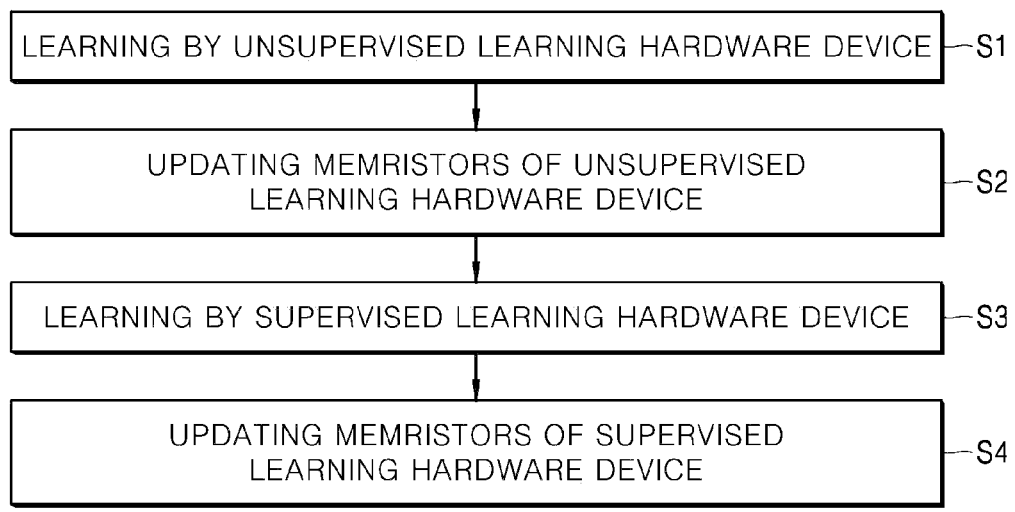
FIG. 14 is a flowchart for illustrating a method for learning by the neuromorphic system according to the first embodiment.

FIG. 14 is a flowchart for illustrating a method for learning by the neuromorphic system according to the first embodiment. The method for learning by the neuromorphic system according to the first embodiment is performed by the neuromorphic system; and, therefore, the specific operation thereof will not be described in detail.

Initially, in the method for learning by the neuromorphic system according to the first embodiment, the unsupervised learning hardware device 1 performs learning. Once the learning is completed, the memristors included in the unsupervised learning hardware device 1 are updated. The learning and the memristor updating may be performed repeatedly for a number of combinations of input signals.

After the learning by the unsupervised learning hardware device 1 and the memristors updating have been completed through the above-described processes, the supervised learning hardware device 2 performs learning. Once the learning is completed, the memristors are updated. The learning and the memristor updating may be performed repeatedly for a number of combinations of input signals.

According to above-described method, it is possible to operate the neuromorphic system faster.

Second Embodiment

In the first embodiment, the unsupervised learning hardware device 1 and the supervised learning hardware device 2 both are implemented with the RBM algorithm. However, the present disclosure is not limited to such hardware configuration but may include other configurations. Like the first embodiment, the unsupervised learning hardware device 1 is disposed prior to the supervised learning hardware device 2 in the second embodiment. However, unlike the first embodiment, the supervised learning hardware device 2 is implemented with the spike-tinning-dependent plasticity (STDP) algorithm. Accordingly, the elements described above with respect to the first embodiment will not be described again.

Figure 15:
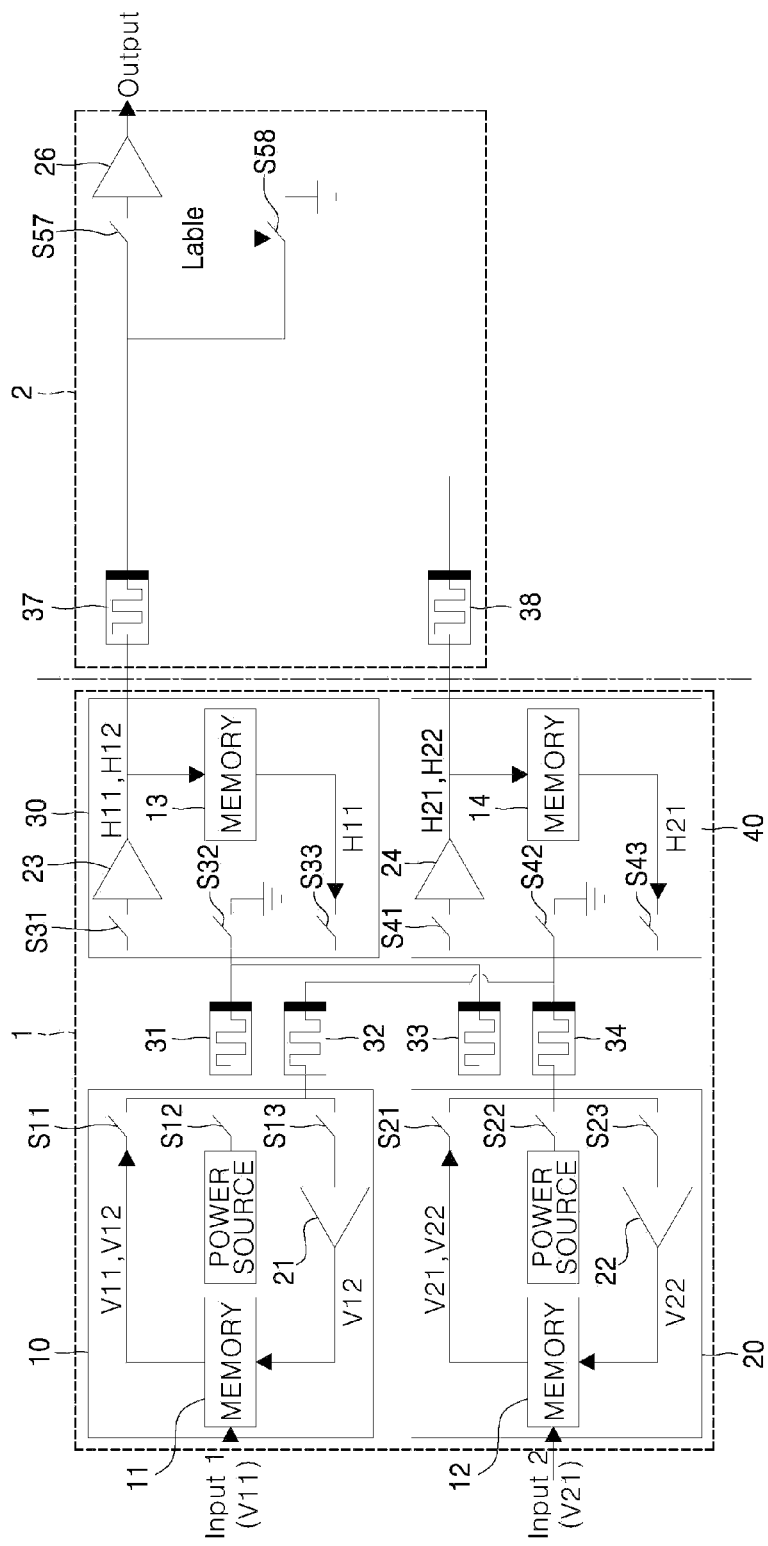
FIG. 15 is a detailed block diagram of a neuromorphic system according to a second embodiment.

FIG. 15 is a detailed block diagram of the neuromorphic system according to the second embodiment.

Referring to FIG. 15, the neuromorphic system according to the second embodiment is identical to the neuromorphic system according to the first embodiment except for the supervised learning hardware device 2. Specifically, a seventh memristor 37 and an eighth memristor 38 are connected to output terminals of the third neuron 23 and the fourth neuron 24, respectively. Output lines from the seventh and eighth memristors 37 and 38 meet and branch into two paths, one connected to the sixth neuron 26 via a switch S57 and the other connected to the ground potential via a switch S58.

The operation of the neuromorphic system according to the second embodiment will be described.

Initially, the switch S57 is closed and the switch S58 is open with an input signal applied during a process of learning. The input signal having passed through the seventh and eighth memristors 37 and 38 is applied to the sixth neuron 26. The sixth neuron 26 sends an output signal by the operation of an integrator and a comparator therein. It is determined whether to update memristors by comparing the output signal with a label value. If the sixth neuron is not turned on even if the label value is ON, the memristors 37 and 38 may be updated such that the resistances thereof are reduced.

During the process of updating values of memristors, on the other hand, the switch S57 is open while the switch S58 is closed, so that pulses can be applied via the third neuron 23 and the fourth neuron 24

What is claimed is:
1. A neuromorphic system comprising:
an unsupervised learning hardware device configured to perform learning in an unsupervised manner, the unsupervised learning hardware device performing grouping on input signals; and
a supervised learning hardware device configured to perform learning in a supervised manner with labeled values, the supervised learning hardware device performing clustering on input signals.

2. The neuromorphic system of claim 1, wherein the supervised learning hardware device is operated with an output value from the unsupervised learning hardware device as an input value.

3. The neuromorphic system of claim 1, wherein the unsupervised learning hardware device employs the restricted Boltzmann machine (RBM) algorithm.

4. The neuromorphic system of claim 1, wherein the supervised learning hardware device employs the restricted Boltzmann machine (RBM) algorithm or the spike-tinning-dependent plasticity (STDP) algorithm.

5. The neuromorphic system of claim 1, wherein the unsupervised learning hardware device comprises:
at least two groups of memristors;
at least two pre-stage circuits disposed prior to the groups of memristors and configured to receive an input signal from an external source, each of the pre-stage circuits comprising at least one neuron; and at least two post-stage circuits disposed subsequent to the groups of memristors and configured to receive output signals from the groups of memristors, each of the post-stage circuits comprising at least one neuron.

6. The neuromorphic system of claim 5, wherein one of the post-stage circuits is connected in parallel to memristors belonging to at least two different groups of memristors.

7. The neuromorphic system of claim 5, wherein the number of the groups of the memristors equals the number of the pre-stage circuits, and the number of the memristors of included in the groups of memristors equals the number of the post-stage circuits.

8. The neuromorphic system of claim 5, wherein the unsupervised learning hardware device comprises a memory that stores output values used when the pre-stage circuits and the post-stage circuits perform positive-phase contrastive divergence and negative-phase contrastive divergence.

9. The neuromorphic system of claim 5, wherein a ground potential is connected to one side of the groups of memristors and an external power source is connected to the other side of the groups of memristors via switches.

10. The neuromorphic system of claim 1, wherein the supervised learning hardware device comprises:
 a memory configured to receive an output value from the unsupervised learning hardware device and receive a label value corresponding to a current input signal;
 at least two memristors configured to receive the output signal; and
 a neuron connected to output terminals of the at least two memristors, the output terminals being connected at least to the memory.

11. The neuromorphic system of claim 10, wherein a line to ground potential is provided between the output terminals of the at least two memristors and an input terminal of the neuron via a switch.

12. The neuromorphic system of claim 1, wherein the supervised learning hardware device comprises:
 at least two memristors configured to receive output values from the unsupervised learning hardware device;
 a neuron connected via a switch to a node where output lines from the at least two memristors meet; and
 a ground potential connected via a switch to the node.

13. A method for operating a neuromorphic system, the method comprising:
 performing learning by an unsupervised learning hardware device;
 updating memristors included in the unsupervised learning hardware device;
 performing learning by a supervised learning hardware device; and
 updating memristors included in the supervised learning hardware device.

14. The method of claim 13, wherein the performing learning and the updating is repeated for a number of combinations of input signals.

* * * * *